United States Patent [19]

Murakami et al.

[11] E Re. 28,698

[45] Reissued Jan. 27, 1976

[54] ELECTROPHOTOGRAPHIC MATERIAL CONTAINING SENSITIZERS

[75] Inventors: Yoshinobu Murakami, Higashi-Osaka; Yo Hasegawa, Suita; Kazuhisa Morimoto, Settsu, all of Japan

[73] Assignee: Matsushita Electric Industrial Co., Ltd., Osaka, Japan

[22] Filed: Aug. 7, 1974

[21] Appl. No.: 495,520

Related U.S. Patent Documents

Reissue of:

[64] Patent No.: 3,712,811
Issued: Jan. 23, 1973
Appl. No.: 121,508
Filed: Mar. 5, 1971

[30] Foreign Application Priority Data

Mar. 13, 1970 Japan ..... 45-21766
Mar. 13, 1970 Japan ..... 45-21767

[52] U.S. Cl. ..... 96/1.6; 260/327 R; 260/345.2
[51] Int. Cl.[2] ..... G03G 5/06
[58] Field of Search ..... 96/1.5, 1.6, 1.7; 252/501; 260/327, 345.2

[56] References Cited

UNITED STATES PATENTS

| | | | |
|---|---|---|---|
| 3,526,502 | 9/1970 | Murakami et al. | 96/1.6 |
| 3,586,500 | 6/1971 | Contois et al. | 96/1.6 |
| 3,617,268 | 11/1971 | Murakami et al. | 96/1.5 |

*Primary Examiner*—Norman G. Torchin
*Assistant Examiner*—Judson R. Hightower
*Attorney, Agent, or Firm*—Wenderoth, Lind & Ponack

[57] ABSTRACT

An electrophotographic material is provided herein which comprises a conductive support layer and a photoconductive insulating layer, the latter layer comprising a photoconductive polymeric compound such as poly-N-vinylcarbazole, and a sensitizer having the following general formula wherein B represents a radical selected from the group consisting of Compounds falling under the latter general formula include such compounds as 2-phenyl-4-[(2′-phenyl-4′-benzopyranylidene) benzyl]-benzopyrylium perchlorate and 2,3-phenyl-4-[(2′-phenyl 4′-benzopyranylidene)benzyl]-6-methylbenzopyrylium perchlorate.

3 Claims, 9 Drawing Figures

ELECTROPHOTOGRAPHIC MATERIAL CONTAINING SENSITIZERS

Matter enclosed in heavy brackets [ ] appears in the original patent but forms no part of this reissue specification; matter printed in italics indicates the additions made by reissue.

This invention relates to novel light-sensitive layers and more particularly to electrophotographic light-sensitive polymer layers.

Various light-sensitive layers are well known in the electrophotographic art for making copies of documents, drawings, transparencies, etc. These layers contain organic photoconductive compounds, such as poly-N-vinylcarbazole, brominated poly-N-vinylcarbazoles, polyacenaphthylene, etc. These layers are non-conductors of electricity before exposure and become electrical conductors upon exposure.

It is necessary for the electrophotographic art that the photoconductive material has a high photoconductivity in the long wavelength region of the visible spectrum. Such a photoconductive material makes it possible for the electrophotograph art to employ inexpensive and convenient light sources such as incandescent lamps in a reduced exposure time and to reproduce colored pictures. The photoconductive materials mentioned above, however, have usually a low photoconductivity and spectrum characteristics sensitive to the short wavelength region of the exposure light and do not satisfy entirely the above requirement.

It is known that an addition of a so-called sensitizer can improve photoconductivity and spectrum characteristics of the above photoconductive compounds. Conventional sensitizers are dyestuff compounds, such as triarylmethane dyes, xanthene dyes, triazine dyes or acridine dyes, but the conventional sensitizers are not entirely satisfactory to improve the photoconductivity and the spectrum characteristics of the available photoconductive compounds.

In addition to the high photoconductivity and spectrum characteristics sensitive to visible light, the electrophotographic art requires a high electric resistance of photoconductive materials in the dark. Conventional sensitizers are apt to increase the dark conductivity whereas they promote the photoconductivity. A high dark conductivity of photoconductive materials is not desirable because it results in a loss of the applied electrostatic charge in the dark.

An object of the invention is to provide electrophotographic materials having a high photoconductivity and spectrum characteristics sensitive to a long wavelength region of the visible spectrum.

Another object of the invention is to provide electrophotographic materials having a high electric resistance in the dark.

These and other objects are accomplished by adding a new sensitizer shown hereinafter to a photoconductive polymeric compound such as poly-N-vinylcarbazole, brominated poly-N-vinylcarbazole or polyacenaphthylene, as a light-sensitive film-forming composition.

Figure 1:
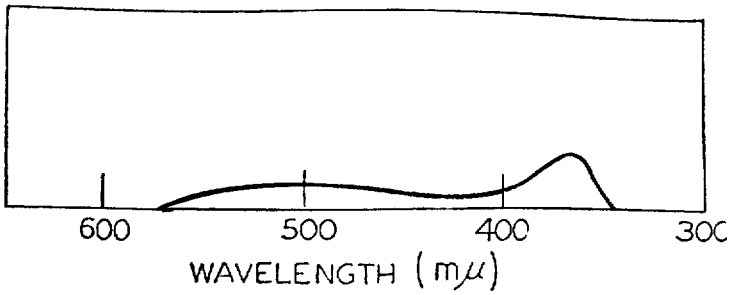

The invention is further explained in the following description with reference to the accompanying drawings wherein:

FIG. 1 represents the wedge spectrogram for an electrophotographic material coated with an unsensitized solution of 10 weight percent of brominated poly-N-vinylcarbazole in chlorobenzene.

Figure 2:
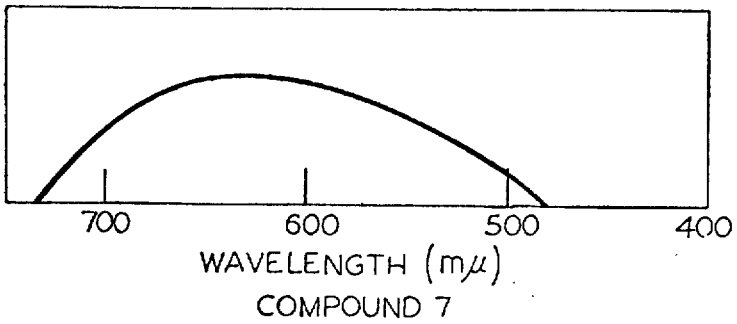

FIG. 2 represents the wedge spectrogram for an electrophotographic material coated with a solution containing 10 weight percent of brominated poly-N-vinylcarbazole sensitized with 0.04 weight percent of 2-(α-phenyl-p-methoxystyryl)-4-[(2'-phenyl-4'-benzopyranylidene)-methyl]benzopyrylium perchlorate, the brominated poly-N-vinylcarbazole being dissolved in a solvent of four weight parts of chlorobenzene and one weight part of dichloroethane.

Figure 3:
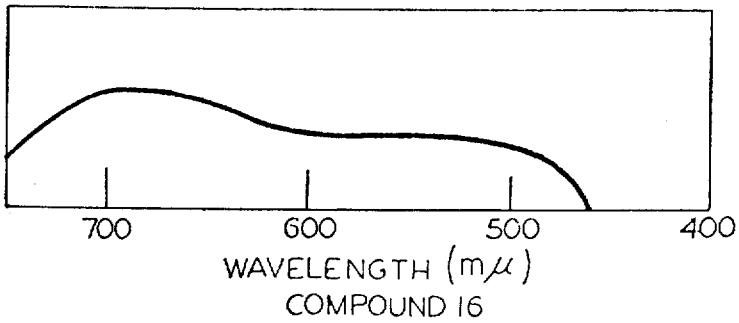

FIG. 3 represents the wedge spectrogram for an electrophotographic material coated with a solution containing 10 weight percent of brominated poly-N-vinylcarbazole sensitized with 0.04 weight percent of 2-styryl-3-phenyl-4-[(2'-styryl-4'-benzopyranylidene)methyl]-6-methylbenzopyrylium perchlorate, the brominated poly-N-vinylcarbazole being dissolved in a solvent of four weight parts of chlorobenzene and one weight part of dichloroethane.

Figure 4:
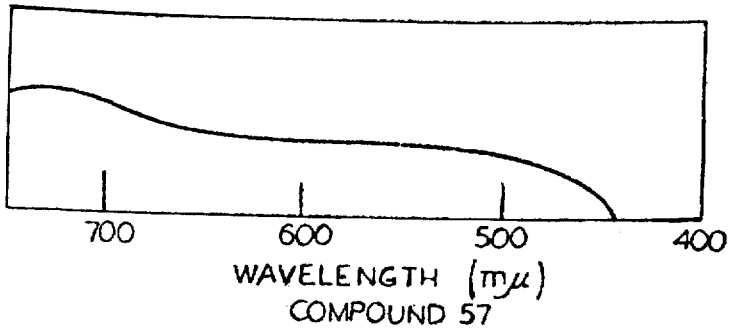

FIG. 4 represents the wedge spectrogram for an electrophotographic material coated with a solution containing 10 weight percent of brominated poly-N-vinylcarbazole sensitized with 0.04 weight percent of 2-p-methoxystyryl-4-[2'-α-phenyl-p-methoxystyryl-4'-benzopyranylidene)methyl]benzopyrylium perchlorate, the brominated poly-N-vinylcarbazole being dissolved in a solvent of four weight parts of chlorobenzene and one weight part of dichloroethane.

Figure 5:
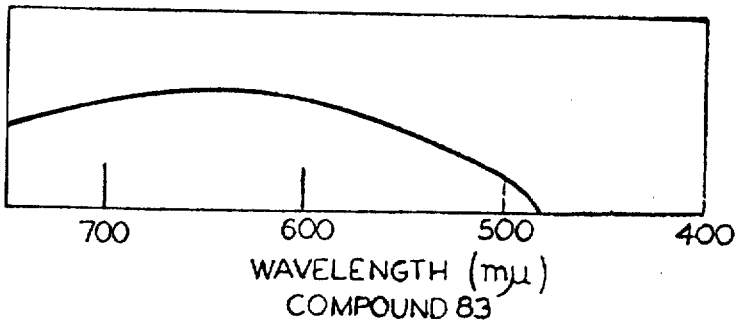

FIG. 5 represents the wedge spectrogram for an electrophotographic material coated with a solution containing 10 weight percent of brominated poly-N-vinylcarbazole sensitized with 0.04 weight percent of 2-p-methoxystyryl-4-[(2'-phenyl-4'-benzothiopyranylidene)-methyl]benzopyrylium perchlorate, the brominated poly-N-vinylcarbazole being dissolved in a solvent of four weight parts of chlorobenzene and one weight part of dichloroethane.

Figure 6:
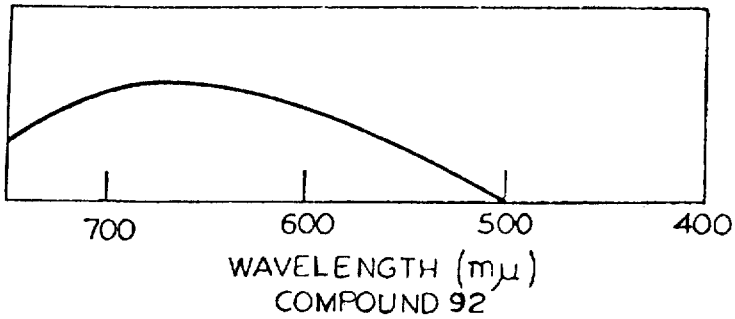

FIG. 6 represents the wedge spectrogram for an electrophotograph material coated with a solution containing 10 weight percent of brominated poly-N-vinyl carbazole sensitized with 0.04 weight percent of 2-[(2'-phenyl-4'-benzopyranylidene)methyl]3-phenylbenzopyrylium perchlorate, the brominated poly-N-vinylcarbazole being dissolved in a solvent of four parts of chlorobenzene and one weight part of dichloroethane.

Figure 7:
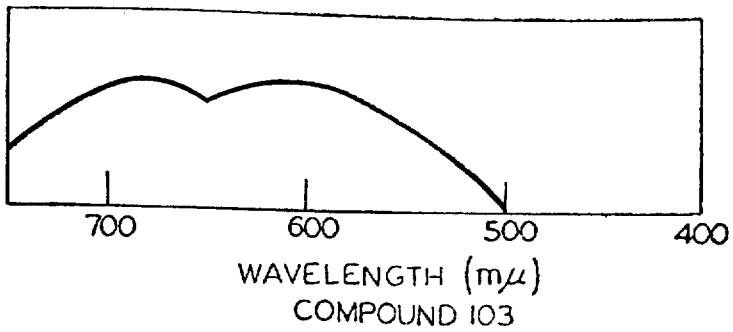

FIG. 7 represents the wedge spectrogram for an electrophotographic material coated with a solution containing 10 weight percent of brominated poly-N-vinylcarbazole sensitized with 0.04 weight percent of 2-[(4'-benzothiopyranylidene)methyl]-3-phenylbenzopyrylium perchlorate, the brominated poly-N-vinylcarbazole being dissolved in a solvent of four weight parts of chlorobenzene and one weight part of dichloroethane.

Figure 8:
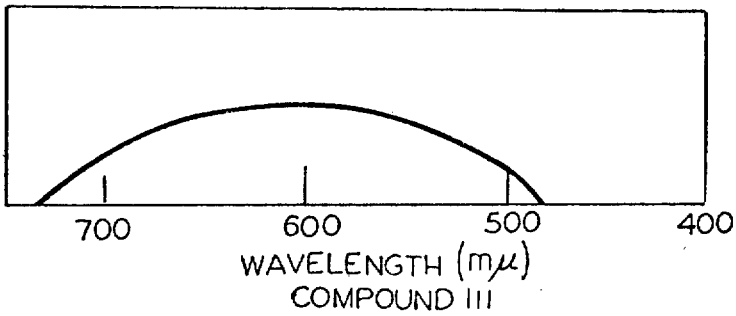

FIG. 8 represents the wedge spectrogram for an electrophotographic material coated with a solution containing 10 weight percent of brominated poly-N-vinylcarbazole sensitized with 0.04 weight percent of 2-[(2'-α-phenyl-p-methoxystyryl-4'-benzopyranylidene)methyl]-3-phenylbenzopyrylium perchlorate, the brominated poly-N-vinylcarbazole being dissolved in a solvent of four weight parts of chlorobenzene and one weight part of dichloroethane.

Figure 9:
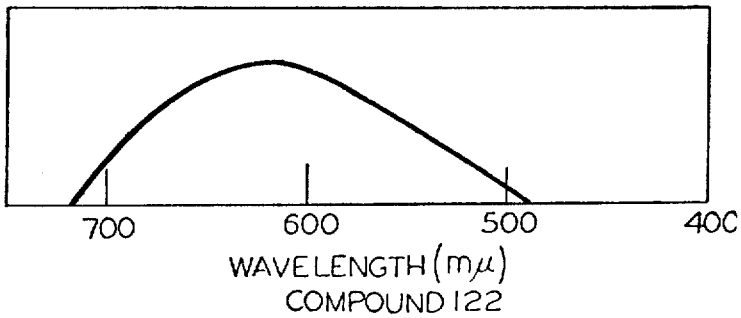

FIG. 9 represents the wedge spectrogram for an electrophotographic material coated with a solution conaining 10 weight percent of brominated poly-N-vinyl-:arbazole sensitized with 0.04 weight percent of 2-[(2'-)henyl-4'-benzothiopyranylidene)methyl]-3-phenyl-)enzopyrylium perchlorate, the brominated poly-N-'inylcarbazole being dissolved in a solvent of four veight parts of chlorobenzene and one weight part of lichloroethane.

The new sensitizer, according to the present invenion has the following formula:

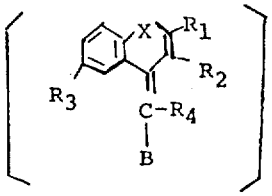

'here B represents a radical selected from the group onsisting of, '

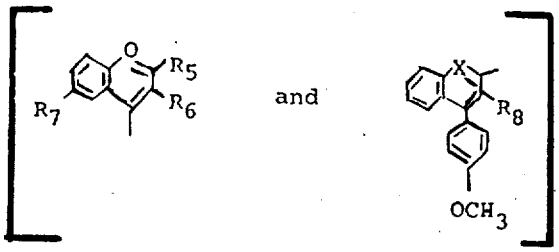

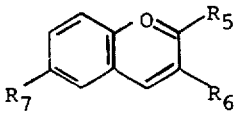

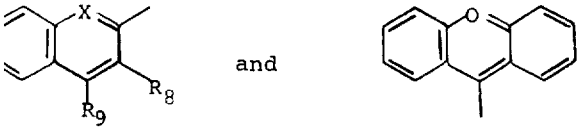

$_1$ is hydrogen, phenyl or an ethenyl or an ethenyl radical selected from the group consisting of styryl,p-methoxystyryl, 3,4-dimethoxystyryl, α-phenylstyryl, α-phenyl-p-methoxystyryl, β-furyl(α')ethenyl and α-phenyl-β-furyl(α')-ethenyl;

$_2$ is hydrogen or phenyl;

$_3$ is hydrogen, methyl or phenyl;

$_4$ is hydrogen or phenyl;

$_5$ is hydrogen, phenyl or an ethenyl radical selected from the group consisting of styryl, p-methoxystyryl, 3,4-dimethoxystyryl, α-phenyl-p-methoxystyryl, β-furyl(α')ethenyl and α-phenyl-β-furyl(α')ethenyl;

$_6$ is hydrogen or phenyl;

$_7$ is hydrogen, methyl or phenyl;

$_8$ is hydrogen or phenyl;

$_9$ *is hydrogen or p-methoxyphenyl;*

.e anion is anionic function selected from the group )nsisting of perchlorate, fluoroborate, chloroferrate, ılorozincate and nitrate; and is oxygen or sulfur atom.

The sensitizers having the formula above mentioned 'e prepared by the following chemical equations A or Equation A

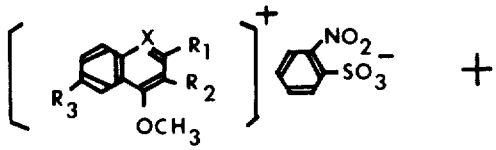

(I)

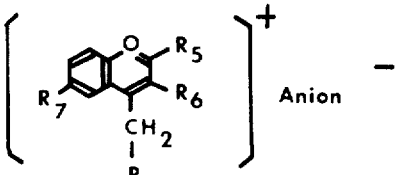

(II)

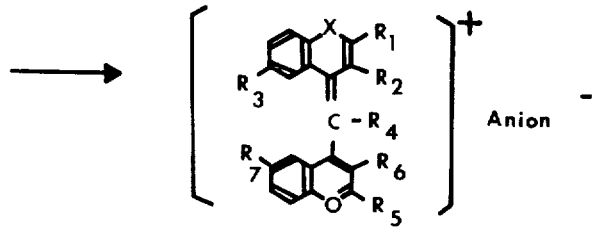

(III)

Equation B

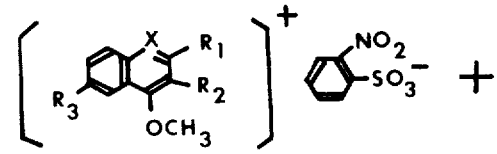

(I)

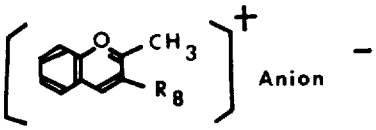

(IV)

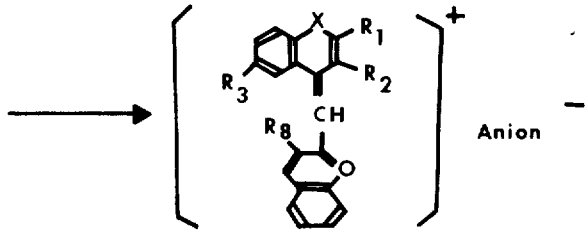

(V)

In the case of Equation A, 4-[(4'-benzopyranylidene)-methyl]benzopyrylium derivative (III) is obtained by an addition reaction of 4-methoxybenzopyrylium o-nitrobenzene sulfonate (I) with a benzopyrylium salt (II) in an acetic anhydride solution. The benzopyrylium salt has an active methyl or methylene radical.

In the case of Equation B, 2-[(4'-benzopyranylidene)-methyl]benzopyrylium derivative (V) is obtained by an addition reaction of 4-methoxybenzopyrylium o-nitrobenzene sulfonate (I) with a benzopyrylium salt (IV) in an acetic anhydride solution. The benzopyrylium salt has an active methyl radical.

In both cases, methyl 2,4-dinitrobenzene sulfonate, dimethyl sulfate or methyl iodide can be used instead of methyl o-nitrobenzene sulfonate.

Representative examples of the benzopyranylidenemethylbenzopyrylium salts and benzothiopyranylidene-methylbenzopyrylium salts according to the invention are listed in Table I.

Table 1

| Compound Number | Name of Compound |
|---|---|
| 1. | 2-phenyl-4-[(2'-phenyl-4'-benzopyranylidene)benzyl]-benzopyrylium perchlorate |
| 2. | 2,3-diphenyl-4-[(2'-phenyl-4'-benzopyranylidene)-benzyl]-6-methylbenzopyrylium perchlorate |
| 3. | 2,3-diphenyl-4-[(2'-phenyl-4'-benzopyranylidene)-methyl]-6-methylbenzopyrylium perchlorate |
| 4. | 2,3-diphenyl-4-[(2'-phenyl-4'-benzopyranylidene)-methyl]-6-phenylbenzopyrylium perchlorate |
| 5. | 2-p-methoxystyryl-4-[(2'-phenyl-4'-benzopyranylidene)-methyl]benzopyrylium perchlorate |
| 6. | 2-β-furyl(α')ethenyl-4-[(2'-phenyl-4'-benzopyranylidene-methyl]benzopyrylium perchlorate |
| 7. | 2-(α-phenyl-p-methoxystyryl)-4-[(2'-phenyl-4'-benzopyranylidene)methyl]benzopyrylium perchlorate |
| 8. | 2-styryl-3-phenyl-4-[(2'-phenyl-4'-benzopyranylidene)-methyl]-6-methylbenzopyrylium perchlorate |
| 9. | 2-p-methoxystyryl-3-phenyl-4-[(2'-phenyl-4'-benzopyranylidene)methyl]-6-methylbenzopyrylium perchlorate |
| 10. | 9-[(2'-phenyl-4'-benzopyranylidene)methyl]xanthylium perchlorate |
| 11. | 2-β-furyl(α')ethenyl-3-phenyl-4-[(2'-phenyl-4'-benzopyranylidene)methyl]-6-methylbenzopyrylium perchlorate |
| 12. | 2,3-diphenyl-4-[(2'-styryl-4'-benzopyranylidene)benzyl]-6-methylbenzopyrylium perchlorate |
| 13. | 2-phenyl-4-[(2'-styryl-4'-benzopyranylidene)benzyl]benzopyrylium perchlorate |
| 14. | 2,3-diphenyl-4-[(2'-styryl-4'-benzopyranylidene)methyl]-6-methylbenzopyrylium perchlorate |
| 15. | 2-(α-phenyl-p-methoxystyryl)-4-[(2'-styryl-4'-benzopyranylidene)methyl]benzopyrylium perchlorate |
| 16. | 2-styryl-3-phenyl-4-[(2'-styryl-4'-benzopyranylidene)methyl]-6-methylbenzopyrylium perchlorate |
| 17. | 9-[(2'-styryl-4'-benzopyranylidene)methyl]xanthylium perchlorate |
| 18. | 2-p-methoxystyryl-3-phenyl-4-[(2'-styryl-4'-benzopyranylidene)methyl]-6-methylbenzopyrylium perchlorate |
| 19. | 2,3-diphenyl-4-[(4'-benzopyranylidene)benzyl]-benzopyrylium perchlorate |
| 20. | 2-phenyl-4-[(4'-benzopyranylidene)benzyl]benzopyrylium perchlorate |
| 21. | 2,3-diphenyl-4-[(4'-benzopyranylidene)methyl]-6-methylbenzopyrylium perchlorate |
| 22. | 2-(α-phenyl-p-methoxystyryl)-4-[(4'-benzopyranylidene)-methyl]benzopyrylium perchlorate |
| 23. | 2-styryl-3-phenyl-4-[(4'-benzopyranylidene)methyl]-6-methylbenzopyrylium perchlorate |
| 24. | 2-p-methoxystyryl-3-phenyl-4-[(4'-benzopyranylidene)-methyl]-6-methylbenzopyrylium perchlorate |
| 25. | 9-[(4'-benzopyranylidene)methyl]xanthylium perchlorate |
| 26. | 2-p-methoxystyryl-4-[(4'-benzopyranylidene)methyl]-benzopyrylium perchlorate |
| 27. | 2-p-methoxystyryl-4-[(2'-p-methoxystyryl-4'-benzopyranylidene)methyl]benzopyrylium perchlorate |
| 28. | 2-(α-phenyl-p-methoxystyryl)-4-[(2'-p-methoxystyryl-4'-benzopyranylidene)methyl]benzopyrylium perchlorate |
| 29. | 2-styryl-3-phenyl-4-[(2'-p-methoxystyryl-4'-benzopyranylidene)methyl]-6-methylbenzopyrylium perchlorate |
| 30. | 2,3-diphenyl-4-[(2'-p-methoxystyryl-4'-benzopyranylidene)-methyl]-6-methylbenzopyrylium perchlorate |
| 31. | 2,3-diphenyl-4-[(2'-p-methoxystyryl-4'-benzopyranylidene)benzyl]-6-methylbenzopyrylium perchlorate |
| 32. | 2-phenyl-4-[(2'-p-methoxystyryl-4'-benzopyranylidene)-benzyl]benzopyrylium perchlorate |
| 33. | 9-[(2'-p-methoxystyryl-4'-benzopyranylidene)methyl]-xanthylium perchlorate |
| 34. | 2-p-methoxystyryl-4-[(4'-benzothiopyranylidene)methyl]-benzopyrylium perchlorate |
| 35. | 2-(α-phenyl-p-methoxystyryl)-4-[(4'-benzothiopyranylidene)-methyl]benzopyrylium perchlorate |
| 36. | 2-styryl-3-phenyl-4-[(4'-benzothiopyranylidene)methyl]-6-methylbenzopyrylium perchlorate |
| 37. | 2,3-diphenyl-4-[(4'-benzothiopyranylidene)methyl]-6-methylbenzopyrylium perchlorate |

Table 1-continued

| Compound Number | Name of Compound |
|---|---|
| 38. | 2,3-diphenyl-4-[(4'-benzothiopyranylidene)benzyl]-6-methylbenzopyrylium perchlorate |
| 39. | 2-phenyl-4-[(4'-benzothiopyranylidene)benzyl]benzopyrylium perchlorate |
| 40. | 9-[(4'-benzothiopyranylidene)methyl]xanthylium perchlorate. |
| 41. | 2-p-methoxystyryl-3-phenyl-4-[(4'-benzothiopyranylidene)-methyl]-6-methylbenzopyrylium perchlorate |
| 42. | 2-p-methoxystyryl-4-[(2'-3'',4''-dimethoxystyryl-4'-benzopyranylidene)methyl]benzopyrylium perchlorate |
| 43. | 2-styryl-3-phenyl-4-[(2'-3'',4''-dimethoxystyryl-4'-benzopyranylidene)methyl]-6-methylbenzopyrylium perchlorate |
| 44. | 9-[(2'-3'',4''-dimethoxystyryl-4'-benzopyranylidene)-methyl]xanthylium perchlorate |
| 45. | 2-phenyl-4-[(2'-β-furyl(α')ethenyl-4'-benzopyranylidene)-benzyl]benzopyrylium perchlorate |
| 46. | 2,3-diphenyl-4-[(2'-β-furyl(α')ethenyl-4'-benzopyranylidene)benzyl]-6-methylbenzopyrylium perchlorate |
| 47. | 2,3-diphenyl-4-[(2'-β-furyl(α')ethenyl-4'-benzopyranylidene)methyl]-6-methylbenzopyrylium perchlorate |
| 48. | 2-p-methoxystyryl-4-[(2'-β-furyl(α')ethenyl-4'-benzopyranylidene)methyl]benzopyrylium perchlorate |
| 49. | 2-(α-phenyl-p-methoxystyryl)-4-[(2'-β-furyl(α')ethenyl-4'-benzopyranylidene)methyl]benzopyrylium perchlorate |
| 50. | 9-[(2'-β-furyl(α')ethenyl-4'-benzopyranylidene)methyl]-xanthylium perchlorate |
| 51. | 2-phenyl-4-[(2'-α-phenylstyryl-4'-benzopyranylidene)-benzyl]benzopyrylium perchlorate |
| 52. | 2-p-methoxystyryl-4-[(2'-α-phenylstyryl-4'-benzopyranylidene)methyl]benzopyrylium perchlorate |
| 53. | 2-(α-phenyl-p-methoxystyryl)-4-[(2'-α-phenylstyryl-4'-benzopyranylidene)methyl]benzopyrylium perchlorate |
| 54. | 2-phenyl-4-[(2'-α-phenyl-p-methoxystyryl-4'-benzopyranylidene)benzyl]benzopyrylium perchlorate |
| 55. | 2,3-diphenyl-4-[(2'-α-phenyl-p-methoxystyryl-4'-benzopyranylidene)benzyl] -6-methylbenzopyrylium perchlorate |
| 56. | 2,3-diphenyl-4-[(2'-α-phenyl-p-methoxystyryl-4'-benzopyranylidene)methyl]-6-methylbenzopyrylium perchlorate |
| 57. | 2-p-methoxystyryl-4-[(2'-α-phenyl-p-methoxystyryl-4'-benzopyranylidene)methyl]benzopyrylium perchlorate |
| 58. | 2-(α-phenyl-p-methoxystyryl)-4-[(2'-α-phenyl-p-methoxystyryl-4'-benzopyranylidene)methyl]benzopyrylium perchlorate |
| 59. | 9-[(2'-α-phenyl-p-methoxystyryl-4'-benzopyranylidene)-methyl]xanthylium perchlorate |
| 60. | 2-p-methoxystyryl-4-[(2'-α-phenyl-β-furyl(α')ethenyl-4'-benzopyranylidene)methyl]benzopyrylium perchlorate |
| 61. | 9-[(2'-α-phenyl-β-furyl(α')ethenyl-4'-benzopyranylidene)methyl]xanthylium perchlorate |
| 62. | 2-phenyl-4-[(2'-p-methoxystyryl-3'-phenyl-6'-methyl-4'-benzopyranylidene)benzyl]benzopyrylium perchlorate |
| 63. | 2,3-diphenyl-4-[(2'-p-methoxystyryl-3'-phenyl-6'-methyl-4'-benzopyranylidene)benzyl]-6-methylbenzopyrylium perchlorate |
| 64. | 2,3-diphenyl-4-[(2'-p-methoxystyryl-3'-phenyl-6'-methyl-4'-benzopyranylidene)methyl]-6-methylbenzopyrylium perchlorate |
| 65. | 2-p-methoxystyryl-4-[(2'-p-methoxystyryl-3'-phenyl-6'-methyl-4'-benzopyranylidene)methyl]benzopyrylium perchlorate |
| 66. | 2-(α-phenyl-p-methoxystyryl)-4-[(2'-p-methoxystyryl-3'-phenyl-6'-methyl-4'-benzopyranylidene)methyl]benzopyrylium perchlorate |
| 67. | 9-[(2'-p-methoxystyryl-3'-phenyl-6'-methyl-4'-benzopyranylidene)methyl]xanthylium perchlorate |
| 68. | 2-phenyl-4-[(2'-3'',4''-dimethoxystyryl-3'-phenyl-6'-methyl-4'-benzopyranylidene)benzyl]benzopyrylium perchlorate |
| 69. | 2,3-diphenyl-4-[(2'-3'',4''-dimethoxystyryl-3'-phenyl-6'-methyl-4'-benzopyranylidene)benzyl]-6-methylbenzopyrylium perchlorate |
| 70. | 2,3-diphenyl-4-[(2'-3'',4''-dimethoxystyryl-3'-phenyl-6'-methyl-4'-benzopyranylidene)methyl] -6-methylbenzopyrylium perchlorate |
| 71. | 2-p-methoxystyryl-4-[(2'-3'',4''-dimethoxystyryl-3'-phenyl-6'-methyl-4'-benzopyranylidene)methyl]benzopyrylium perchlorate |
| 72. | 2-(α-phenyl-p-methoxystyryl)-4-[(2'-3'',4''-dimethoxystyryl-3'-phenyl-6'-methyl-4'-benzopyranylidene)methyl]-benzopyrylium perchlorate |
| 73. | 9-[(2'-3'',4''-dimethoxystyryl-3'-phenyl-6'-methyl-4'-benzopyranylidene)methyl]xanthylium perchlorate |
| 74. | 2-phenyl-4-[(2'-β-furyl(α')ethenyl-3'-phenyl-6'-methyl-4'-benzopyranylidene)benzyl]benzopyrylium perchlorate |
| 75. | 2,3-diphenyl-4-[(2'-β-furyl(α')ethenyl-3'-phenyl-6'-methyl-4'-benzopyranylidene)-benzyl]-6-methylbenzopyrylium perchlorate |

Table 1-continued

| Compound Number | Name of Compound |
|---|---|
| 76. | 2,3-diphenyl-4-[(2'-β-furyl(α')ethenyl-3'-phenyl-6'-methyl-4'-benzopyranylidene)methyl]-6-methylbenzopyrylium perchlorate |
| 77. | 2-p-methoxystyryl-4-[(2'-β-furyl(α')ethenyl-3'-phenyl-6'-methyl-4'-benzopyranylidene)methyl]benzopyrylium perchlorate |
| 78. | 2-(α-phenyl-p-methoxystyryl)-4-[(2'-β-furyl(α')ethenyl-3'-phenyl-6'-methyl-4'-benzopyranylidene)methyl]-benzopyrylium perchlorate |
| 79. | 9-[(2'-β-furyl(α')ethenyl-3'-phenyl-6'-methyl-4'-benzopyranylidene)methyl]xanthylium perchlorate |
| 80. | 2-phenyl-4-[(2'-phenyl-4'-benzothiopyranylidene)benzyl]-benzopyrylium perchlorate |
| 81. | 2,3-diphenyl-4-[(2'-phenyl-4'-benzothiopyranylidene)-benzyl]-6-methylbenzopyrylium perchlorate |
| 82. | 2,3-diphenyl-4-[(2'-phenyl-4'-benzothiopyranylidene)-methyl]-6-methylbenzopyrylium perchlorate |
| 83. | 2-p-methoxystyryl-4-[(2'-phenyl-4'-benzothiopyranylidene)methyl]benzopyrylium perchlorate |
| 84. | 2-(α-phenyl-p-methoxystyryl)-4-[(2'-phenyl-4'-benzothiopyranylidene)methyl]benzopyrylium perchlorate |
| 85. | 2-p-methoxystyryl-3-phenyl-4-[(2'-phenyl-4'-benzothiopyranylidene)methyl] -6-methylbenzopyrylium perchlorate |
| 86. | 2-styryl-3-phenyl-4-[(2'-phenyl-4'-benzothiopyranylidene)methyl]-6-methylbenzopyrylium perchlorate |
| 87. | 9-[(2'-phenyl-4'-benzothiopyranylidene)methyl]xanthylium perchlorate |
| 88. | 2-(α-phenyl-p-methoxystyryl)-4-[(2'-phenyl-4'-benzopyranylidene)methyl]benzopyrylium fluoborate |
| 89. | 2-(α-phenyl-p-methoxystyryl)-4-[(2'-phenyl-4'-benzopyranylidene)methyl]benzopyrylium chloroferrate |
| 90. | 2-(α-phenyl-p-methoxystyryl)-4-[(2'-phenyl-4'-benzopyranylidene)methyl]benzopyrylium chlorozincate |
| 91. | 2-[(2'-phenyl-4'-benzopyranylidene)methyl]-benzopyrylium perchlorate |
| 92. | 2-[(2'-phenyl-4'-benzopyranylidene)methyl]-3-phenylbenzopyrylium perchlorate |
| 93. | 2-[(2'-phenyl-4'-benzopyranylidene)methyl]-3-phenylbenzopyrylium fluoborate |
| 94. | 2-[(2'-phenyl-4'-benzopyranylidene)methyl]-3-phenylbenzopyrylium chloroferrate |
| 95. | 2-[(2'-phenyl-4'-benzopyranylidene)methyl]-3-phenylbenzopyrylium nitrate |
| 96. | 2-[(2'-styryl-4'-benzopyranylidene)methyl]benzopyrylium perchlorate |
| 97. | 2-[(2'-styryl-4'-benzopyranylidene)methyl]-3-phenylbenzopyrylium perchlorate |
| 98. | 2-[(4'-benzopyranylidene)methyl]benzopyrylium perchlorate |
| 99. | 2-[(4'-benzopyranylidene)methyl]-3-phenylbenzopyrylium perchlorate |
| 100. | 2-[(2'-p-methoxystyryl-4'-benzopyranylidene)methyl]-benzopyrylium perchlorate |
| 101. | 2-[(2'-p-methoxystyryl-4'-benzopyranylidene)methyl]-3-phenylbenzopyrylium perchlorate |
| 102. | 2-[(4'-benzothiopyranylidene)methyl]benzopyrylium perchlorate |
| 103. | 2-[(4'-benzothiopyranylidene)methyl]-3-phenylbenzopyrylium perchlorate |
| 104. | 2-[(2'-3'',4''-dimethoxystyryl-4'-benzopyranylidene)-methyl]benzopyrylium perchlorate |
| 105. | 2-[(2'-3'',4''-dimethoxystyryl-4'-benzopyranylidene)-methyl]-3-phenylbenzopyrylium perchlorate |
| 106. | 2-[(2'-β-furyl(α')ethenyl-4'-benzopyranylidene)methyl]-benzopyrylium perchlorate |
| 107. | 2-[(2'-β-furyl(α')ethenyl-4'-benzopyranylidene)methyl]-3-phenylbenzopyrylium perchlorate |
| 108. | 2-[(2'-α-phenylstyryl-4'-benzopyranylidene)methyl]-benzopyrylium perchlorate |
| 109. | 2-[(2'-α-phenylstyryl-4'-benzopyranylidene)methyl]-3-phenylbenzopyrylium perchlorate |
| 110. | 2-[(2'-α-phenyl-p-methoxystyryl-4'-benzopyranylidene)-methyl]benzopyrylium perchlorate |
| 111. | 2-[(2'-α-phenyl-p-methoxystyryl-4'-benzopyranylidene)-methyl]-3-phenylbenzopyrylium perchlorate |
| 112. | 2-[(2'-α-phenyl-β-furyl(α')ethenyl-4'-benzopyranylidene)methyl]-3-phenylbenzopyrylium perchlorate |
| 113. | 2-[(2'-p-methoxystyryl-3',6'-diphenyl-4'-benzopyranylidene)methyl]-3-phenylbenzopyrylium perchlorate |
| 114. | 2-[(2'-3'',4''-dimethoxystyryl-3',6'-diphenyl-4'-benzopyranylidene)methyl]-3-phenylbenzopyrylium perchlorate |
| 115. | 2-[(2'-p-methoxystyryl-3'-phenyl-6'-methyl-4'-benzopyranylidene)methyl]benzopyrylium perchlorate |
| 116. | 2-[(2'-p-methoxystyryl-3'-phenyl-6'-methyl-4'-benzopyranylidene)methyl] 3-phenylbenzopyrylium perchlorate |
| 117. | 2-[(2'-3'',4'',-dimethoxystyryl-3'-phenyl-6'-methyl-4'-benzopyranylidene)methyl]benzopyrylium perchlorate |

Table 1-continued

| Compound Number | Name of Compound |
|---|---|
| 118. | 2-[(2'-3'',4''-dimethoxystyryl-3'-phenyl-6'-methyl-4'-benzopyranylidene)methyl]-3-phenylbenzopyrylium perchlorate |
| 119. | 2-[(2'-β-furyl(α')ethenyl-3'-phenyl-6'-methyl-4'-benzopyranylidene)methyl]benzopyrylium perchlorate |
| 120. | 2-[(2'-β-furyl(α')ethenyl-3'-phenyl-6'-methyl-4'-benzopyranylidene)methyl]-3-phenylbenzopyrylium perchlorate |
| 121. | 2-[(2'-phenyl-4'-benzothiopyranylidene)methyl]benzopyrylium perchlorate |
| 122. | 2-[(2'-phenyl-4'-benzothiopyranylidene)methyl]-3-phenylbenzopyrylium perchlorate |
| 123. | 2-[(2'-phenyl-4'-benzopyranylidene)methyl]-4-p-methoxyphenylbenzothiopyrylium perchlorate |
| 124. | 2-[(2'-phenyl-4'-benzopyranylidene)methyl]-3-phenyl-4-p-methoxyphenylbenzopyrylium perchlorate |
| 125. | 2-[(2'-α-phenyl-p-methoxystyryl-4'-benzopyranylidene)-methyl]-4-p-methoxyphenylbenzothiopyrylium perchlorate |
| 126. | 2-[(2'-α-phenyl-p-methoxystyryl-4'-benzopyranylidene)-methyl]-3-phenyl-4-p-methoxyphenylbenzothiopyrylium perchlorate |
| 127. | 2-[(2'-phenyl-4'-benzothiopyranylidene)methyl]-4-p-methoxyphenylbenzothiopyrylium perchlorate |
| 128. | 2-[(2'-phenyl-4'-benzothiopyranylidene)methyl]-3-phenyl-4-p-methoxyphenylbenzothiopyrylium perchlorate |

Table 2 lists additional information on the absorption maximum in dichloroethane and melting point of the novel compounds according to the invention.

Table 2

| Compound Number | Melting Point | Absorption Maximum in dichloroethane (mμ) |
|---|---|---|
| 1 | 135~139 | 415 and 710 |
| 2 | 130~132 | 430 and 720 |
| 3 | 182~187 | 410 and 630 |
| 4 | 164~170 | 635 |
| 5 | 163~172 | 490 and 575 |
| 6 | >300 | 575 and 660 |
| 7 | 162~169 | 500 and 610 |
| 8 | 180~187 | 490 and 670 |
| 9 | 157~160 | 550 and 670 |
| 10 | 103~105 | 610 |
| 11 | 120~126 | 595 |
| 12 | 176~180 | 430 and 700 |
| 13 | 122~126 | 420 and 730 |
| 14 | 163~170 | 420 and 650 |
| 15 | 160~164 | 500 and 600 |
| 16 | 166~169 | 495 and 710 |
| 17 | 135~140 | 580 |
| 18 | 159~162 | 555 |
| 19 | 179~181 | 420 and 730 |
| 20 | 140~142 | 415 and 730 |
| 21 | 165~172 | 410 and 700 |
| 22 | 174~178 | 500 and 600 |
| 23 | 176~179 | 485 |
| 24 | 170~175 | 505 |
| 25 | >300 | 630 |
| 26 | >300 | 560 |
| 27 | 191~197 | 560 |
| 28 | 201~203 | 500 and 590 |
| 29 | 200~204 | 660 and 710 |
| 30 | 185~189 | 410 and 650 |
| 31 | 178~183 | 430 and 690 |
| 32 | 181~188 | 420 and 700 |
| 33 | 117~123 | 550 and 650 |
| 34 | 185~189 | 590 |
| 35 | 159~164 | 495 and 600 |
| 36 | 185~188 | 610, 650 and 700 |
| 37 | 160~165 | 415 and 650 |
| 38 | 204~206 | 425 and 700 |
| 39 | 166~169 | 415 and 730 |
| 40 | >300 | 660 |
| 41 | 173~180 | 555 |
| 42 | 175~181 | 540 and 600 |
| 43 | 167~173 | 660 and 710 |
| 44 | 161~164 | 580 and 720 |
| 45 | 145~150 | 415 and 720 |
| 46 | 188~190 | 425 and 720 |
| 47 | 168~175 | 670 |
| 48 | 171~176 | 490 and 580 |
| 49 | 179~186 | 600 and 720 |
| 50 | 171~175 | 610 and 660 |
| 51 | 151~155 | 480 and 740 |
| 52 | 171~176 | 495 and 580 |
| 53 | 173~177 | 590 and 700 |
| 54 | 140~147 | 550 and 750 |
| 55 | 203~207 | 420 and 680 |

Table 2-continued

| Compound Number | Melting Point | Absorption Maximum in dichloroethane (mμ) |
|---|---|---|
| 56 | 138~ 142 | 555 and 680 |
| 57 | 170~175 | 570 |
| 58 | 154~157 | 585 and 690 |
| 59 | 168~174 | 570 |
| 60 | 206~209 | 600 |
| 61 | >300 | 650 |
| 62 | 139~146 | 550 |
| 63 | 202~204 | 425 and 700 |
| 64 | 173~177 | 530 and 690 |
| 65 | 190~194 | 590 |
| 66 | 190~193 | 500 and 600 |
| 67 | 192~195 | 620 |
| 68 | 112~118 | 570 and 760 |
| 69 | 190~192 | 495 |
| 70 | 154~159 | 650 and 700 |
| 71 | 177~182 | 500 and 710 |
| 72 | 176~181 | 590 |
| 73 | 195~199 | 495 and 640 |
| 74 | 189~195 | 550 |
| 75 | 184~187 | 415 and 720 |
| 76 | 192~196 | 640 and 700 |
| 77 | >300 | 550 |
| 78 | 219~222 | 550 |
| 79 | 226~230 | 630 |
| 80 | 127~134 | 410 and 745 |
| 81 | 190~192 | 425 and 730 |
| 82 | 156~159 | 665 |
| 83 | 164~169 | 600 and 680 |
| 84 | 175~ 178 | 600 and 720 |
| 85 | 170~177 | 550 and 700 |
| 86 | 157~166 | 650 and 695 |
| 87 | 169~172 | 635 |
| 88 | 137~140 | 500 and 610 |
| 89 | 167~172 | 500 and 610 |
| 90 | 160~163 | 500 and 610 |
| 91 | >300 | 575 |
| 92 | 128~134 | 575 and 675 |
| 93 | 133~136 | 575 and 675 |
| 94 | 152~158 | 575 and 675 |
| 95 | 133~138 | 575 |
| 96 | 190~195 | 575 |
| 97 | 156~158 | 620 and 690 |
| 98 | 225~229 | 565 |
| 99 | 183~187 | 525 and 560 |
| 100 | 208~212 | 570 |
| 101 | 170~176 | 630 and 690 |
| 102 | 225~228 | 610 |
| 103 | 163~168 | 610 and 690 |
| 104 | 178~184 | 510 |
| 105 | 172~175 | 580 and 690 |
| 106 | 167~171 | 565 and 620 |
| 107 | 190~194 | 560 and 635 |
| 108 | 211~214 | 570 and 610 |
| 109 | 175~179 | 570 and 610 |
| 110 | 198~201 | 570 and 610 |
| 111 | 158~163 | 580 and 630 |
| 112 | >300 | 600 and 645 |
| 113 | 185~188 | 570 and 620 |
| 114 | 199~204 | 600 |
| 115 | 211~215 | 565 and 600 |
| 116 | 177~181 | 570 and 610 |
| 117 | 205~207 | 570 |
| 118 | 190~194 | 590 |
| 119 | 237~241 | 560 |
| 120 | >300 | 590 |
| 121 | 207~210 | 565 and 605 |
| 122 | 155~158 | 615 and 675 |
| 123 | 143~145 | 615 |
| 124 | 126~131 | 619 |
| 125 | 144~148 | 559 and 657 |
| 126 | 140~142 | 589 and 663 |
| 127 | 149~153 | 656 |
| 128 | 141~145 | 660 |

The following description will explain a practical method for making benzopyranylidene-methylbenzopyrylium salts or benzothiopyranylidene-methylbenzopyrylium salts with reference to exemplary compounds. The details of the preparation of other compounds will be apparent to the skilled in the art from the preceding disclosure and the following illustrative examples of preparation methods of various compounds according to the invention:

(a) 2-phenyl-4-[(2'-phenyl-4'-benzopyranylidene)-benzyl]benzopyrylium perchlorate (compund number 1)

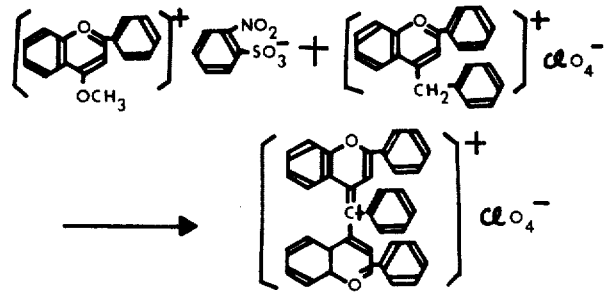

5.5 Grams of 2-phenyl-4-methoxybenzopyrylium o-nitrobenzene sulfonate, which is obtained from flavone and methyl o-nitrobenzenesulfonate, and 5 grams of 2-phenyl-4-benzylbenzopyrylium perchlorate are dissolved in 150 milliliters of acetic anhydride to a solution. The solution is then refluxed for 15 minutes and poured into 900 milliliters of 10 weight percent perchloric acid. The solution is filtered to obtain a precipitate. The precipitate is dried and dissolved again in dichloroethan to a solution. For purification the solution is poured into ether. Precipitated crystals are filtered off, washed with ether and dried to obtain 4 grams (theoretical yield 53%) of green crystals having a melting point of 135° to 139° C.

(b) 2-(α-phenyl-p-methoxystyryl)-4-[(2'-phenyl-4'-benzopyranylidene)methyl]benzopyrylium perchlorate (compound number 7)

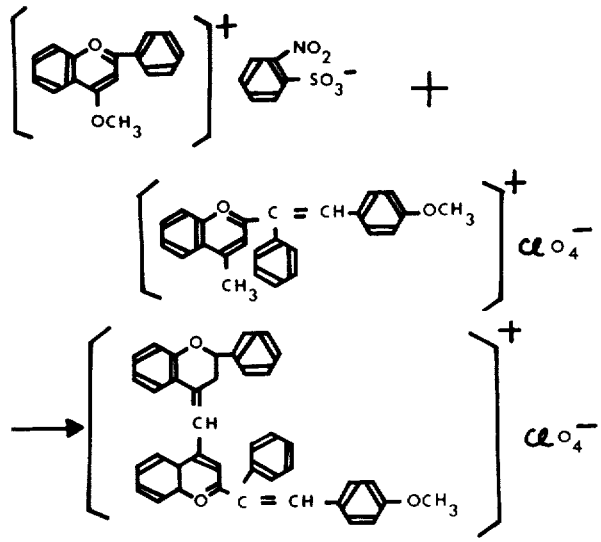

5.5 grams of 2-(α-phenyl-p-methoxystyryl)-4-methylbenzopyrylium perchlorate and 5.5 grams of 2-phenyl-4-methoxybenzopyrylium o-nitrobenzene sulfonate are dissolved in 150 milliliters of acetic anhydride to a solution. The solution is then refluxed for 15 minutes and poured into 900 milliliters of 10 weight percent perchloric acid. The solution is filtered to obtain a precipitate. The precipitate is reprecipitated with dichloroethane ether. Precipitated crystals are filtered off, washed with ether and dried to obtain 5.5 grams (theoretical yield 69%) of blue crystals having a melting point of 162° to 169°C. In the procedure above mentioned the solution ios poured into an ether solution of $BF_3.O(C_2H_5)_2$ instead of 10 weight percent perchloric acid. In this case 2-(α-phenyl-p-methoxystyryl)-4-[(2'-phenyl-4'-benzopyranylidene)methyl]benzopyrylium fluoroborate (compound number 88) is obtained. In the procedure when the solution is poured into a 10 weight percent zinc chloride aqueous solution, 2-(α-phenyl-p-methoxystyryl)-4-[(2'-phenyl-4'-benzopyranylidene)-methyl]benzopyrylium chlorozincate (compound number 90) is obtained.

(c) 2-p-methoxystyryl-3-phenyl-4-[(2'-styryl-4'-benzopyranylidene)methyl]-6-methylbenzopyrylium perchlorate (compound number 18)

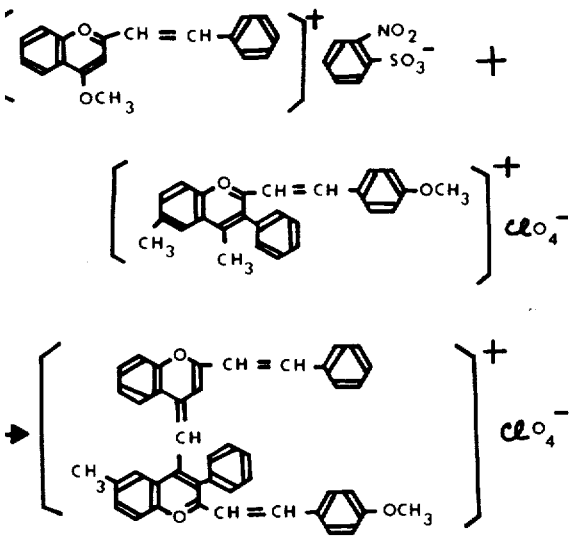

2-styryl-4-methoxybenzopyrylium o-nitrobenzenesulfon (melting point, 155° to 157° C) is obtained by a reaction of 2-styrylchromone and methyl o-nitrobenzenesulfonate in dry benzene at 50° C for 24 hours. According to the same reaction as shown in procedure a), 2-styryl-4-methoxybenzopyrylium o-nitrobenzenesulfonate reacts with 2-p-methoxystyryl-3-phenyl-4,6-dimethylbenzopyrylium perchlorate to obtain 2-p-methoxystyryl-3-phenyl-4-[(2'-styryl-4'-benzopyranylidene)methyl]-6-methylbenzopyrylium perchlorate crystals which have a color of reddish violet in dichloroethane and have a melting point of 159° to 162° C. The product is obtained in 73% yield.

(d) 2-(α-phenyl-p-methoxystyryl)-4-[(4'-benzopyranylidene)-methyl]benzopyrylium perchlorate (compound number 22)

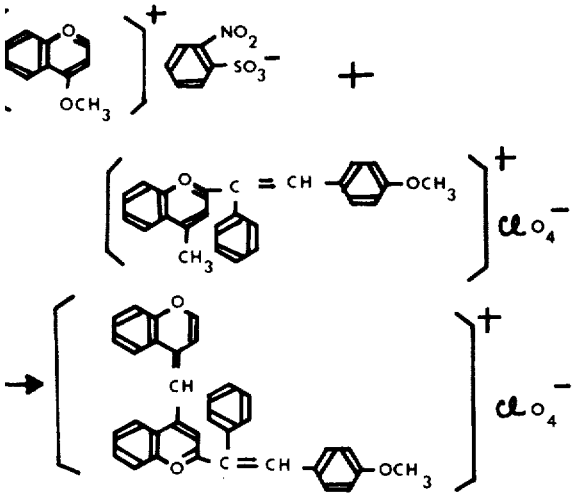

4-methoxybenzopyrylium o-nitrobenzenesulfonate reacts with 2-(α-phenyl-p-methoxystyryl)-4-methyl]-benzopyrylium perchlorate to 2-(α-phenyl-p-methoxystyryl)-4-[(4'-benzopyranylidene)methyl]-benzopyrylium perchlorate in the same procedure as the procedure (a). The crystals have a color of violet in dichloroethane and a melting point of 174° to 178°C. The product is obtained in 95% yield.

(e) 2-p-methoxystyryl-4-[(2'-3'',4''-dimethoxystyryl-4'-benzopyranylidene)methyl]benzopyrylium perchlorate (compound number 42)

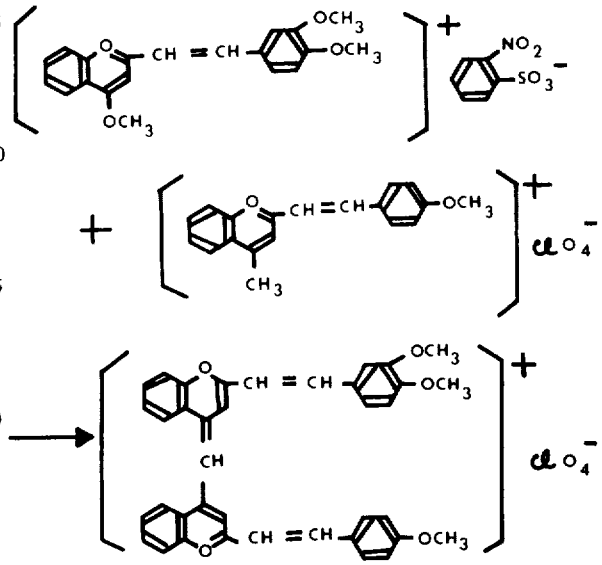

2-(3',4'-Dimethoxystyryl)-4-methoxybenzopyrylium o-nitrobenzenesulfonate (melting point 211° to 213°C) is obtained from a reaction of 2-(3',4'-dimethoxystyryl)chromone and methyl o-nitrobenzene sulfonate. 6.5 Grams of 2-(3',4'-dimethoxystyryl)-4-methoxybenzopyrylium o-nitrobenzenesulfonate and 4,5 grams of 2-p-methoxystyryl-4-methylbenzopyrylium perchlorate are dissolved in 150 milliliters of acetic anhydride to a solution. The solution is heated at 100°C for 100 minutes. After cooling the solution is poured into 900 milliliters of 10 weight percent perchloric acid. Precipitates are filtered off and dried. For purification, reprecipitation is made using dichlorethane and ether. 3.2 Grams of product is obtained in 41% yield. The product has a color of drak violet in dichloroethane and a melting point of 175° to 181°C.

(f) 2-(α-phenyl-p-methoxystyryl)-4-(2'-p-methoxystyryl-3'-phenyl-6'-methyl-4'-benzopyranylidene)methyl]-benzopyrylium perchlorate (compound number 66)

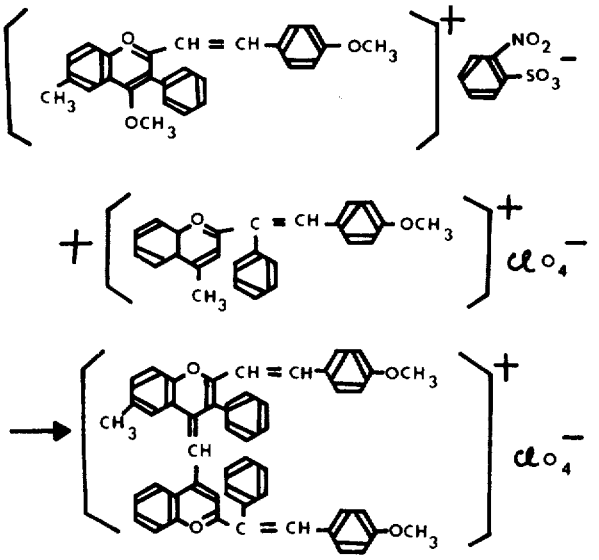

2-p-Methoxystyryl-3-phenyl-4-methoxy-6-methylbenzopyrylium o-nitrobenzenesulfonate (melting point 141° to 144°C) is obtained from 2-p-methoxystyryl-3-phenyl-6-methylchromone and methyl o-nitrobenzenesulfonate. 2-p-methoxystyryl-3-phenyl-4-methoxy-6-methylbenzopyrylium o-nitrobenzenesulfonate reacts with 2-(α-phenyl-p-methoxystyryl)-4-methylbenzopyrylium perchlorate in the same procedure as the procedure (e). The product has a color of violet in dichloroethane and a melting point of 190° to 193° C.

(g) 2-p-methoxystyryl-3-phenyl-4-[(2'-phenyl-4'-benzothiopyranylidene)methyl]-6-methyl]benzopyrylium perchlorate (compound number 85)

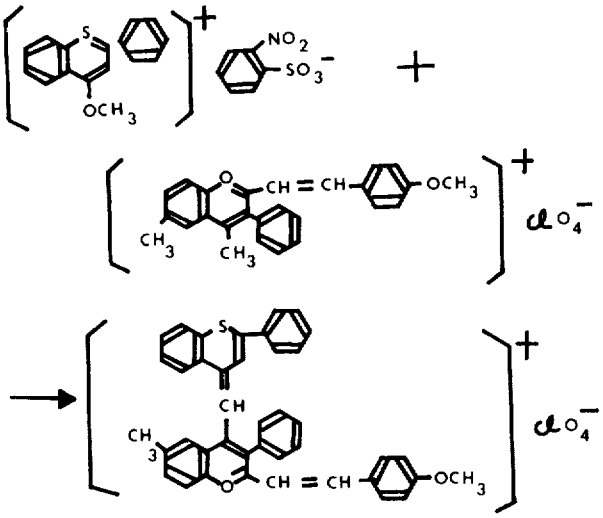

2-phenyl-4-methoxybenzothiopyrylium o-nitrobenzenesulfonate is obtained from thioflavone and methyl o-nitrobenzenesulfonate. As the same procedure as procedure (e), the product is obtained in 62% yield. The product has a color of reddish violet in dichloroethane and a melting point of 170° to 177° C.

(h) 2-[(2'-phenyl-4'-benzopyranylidene)methyl]-3-phenylbenzopyrylium perchlorate (compound number 92)

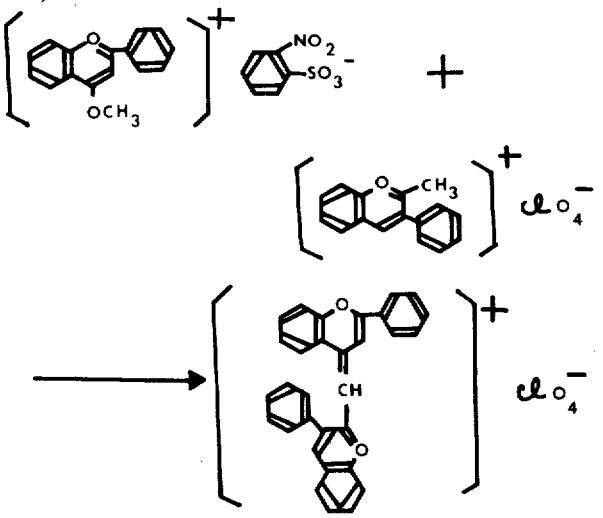

5.5 grams of 2-phenyl-4-methoxybenzopyrylium o-nitrobenzenesulfonate, which is obtained from flavone and methyl o-nitrobenzenesulfonate, and 4 grams of 2-methyl-3-phenylbenzopyrylium perchlorate are dissolved in 150 milliliters of acetic anhydride to a solution. The solution is heated at 100° C for 15 minutes. After cooling the solution is poured into 900 milliliters of 10 weight percent perchloric acid. Precipitated product is filtered off and dried. For purification, reprecipitation is made using dichloroethane and ether. The product has a color of blue in dichloroethane and a melting point of 128° to 134° C. The product yields 3 grams (theoretical yield 46%). Compound number 93 (fluoborate), compound number 94 (chloroferrate) or compound number 95 (nitrate) is obtained using either solution of borontrifluoride etherate, aqueous solution of ferric chloride or diluted nitric acid respectively instead of 10 weight percent perchloric acid.

(i) 2[(2'- 4 -phenyl-p-methoxystyryl-4'-benzopyranylidene)methyl]-3-phenylbenzopyrylium perchlorate (compound number 11)

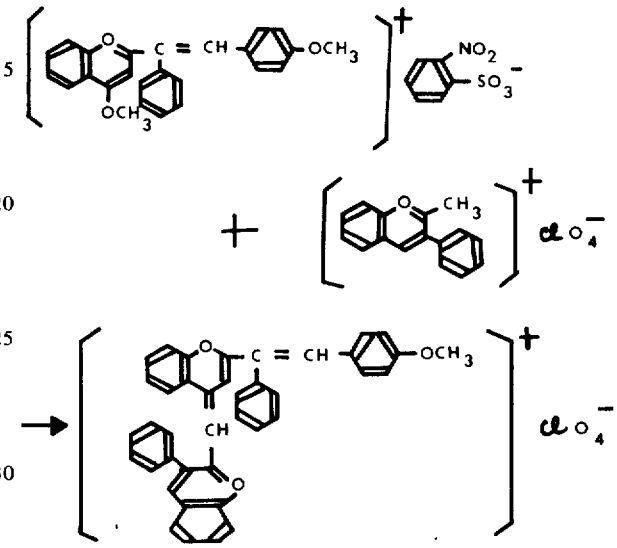

2-(α-Phenyl-p-methoxystyryl)-4-methoxybenzopyrylium o-nitrobenzenesulfonate, which is obtained from 2-(α-phenyl-p-methoxystyryl)chromone and methyl o-nitrobenzenesulfonate, reacts with 2-methyl-3-phenylbenzopyrylium perchlorate in the same procedure as procedure (h). The reaction product yields in 43%. The product has a color of violet in dichloroethane and a melting point of 158° to 163°C.

It has been discovered according to the invention the compounds listed in Table 1 are sensitizing agents which can improve the photoconductivity and the spectrum characteristics of photoconductive polymeric compounds such as poly-N-vinylcarbazole, brominated poly-N-vinylcarbazoles, polyacenaphthylene, etc. These polymers, except brominated poly-N-vinylcarbazoles, are prepared in a per se well known method. The brominated poly-N-vinylcarbazole can be prepared by the following method: To the solution of 20 grams of poly-N-vinylcarbazole in 450 milliliters of chlorobenzene, there are added 18.44 grams of N-bromosuccinimide and 0.173 grams of benzoyl peroxide. The mixture is heated at 80°C for 2 hours while being stirred thoroughly and is poured into methanol to obtain a white polymer. The polymer is dissolved in chlorobenzene and again poured into methanol for purification. The pure polymer thus obtained as a precipitate exhibits upon elementary analysis a halogen content of 29.87 weight percent which approximates the value calculated, i.e. 29.44 weight percent of the monobromosubstituted product from poly-N-vinylcarbazole. This indicates that the polymer obtained is a monobromosubstituted product. The degree of bromination varies from 50 mole percent to 200 mole percent according to reaction conditions.

The novel sensitizer comprising at least one compound from the group listed in Table 1 is dissolved in a suitable solvent, such as dichloroethane, methylene chloride, chloroform, or a combination thereof, and is dded to the solution of the photoconductive polymer escribed above. The preferable amount of the sensizer added is from 0.01 to 3.0 weight parts in connecion with 100 weight parts of the photoconductive polyner. Advantageously, the amount thereof is from 0.1 to .0 weight parts in connection with 100 weight parts of he photoconductive polymer.

For the preparation of the photoconductive insulatng layer, a said solution of the photoconductive polyner and the sensitizer in a suitable solvent is applied to he electroconductive support in per se usual manner, or example, by spraying, by means of bladed coating, y means of whirler coating, etc., and then dried so as o produce a homogeneous photoconductive insulating ayer on the electroconductive support. Operable solents are benzene, toluene, chlorobenzene, dioxane, nethylene chloride, dichloroethane and combinations hereof. Said solution may be incorporated with suitble plasticizers and/or organic colloids for improving he flexibility and strength of the photoconductive polmer. Operable plasticizers are as follows: chlorinated liphenyl, dimethyl phthalate, diethyl phthalate and ctyl phthalate. Operable organic colloids are as folows: natural and synthetic resins, e.g. phenol resin, henol resin modified with resin, polyvinyl acetal, polyinyl butyral, polyvinyl cinnamate, polycarbonate esin. Operable materials for electroconductive suports may be made of any materials which satisfy the equirement of the electrophotographic art, e.g. metal late or glass plate having NESA coating, plate or foil ade of electrically conductive resin or coated with vaporated thin metal layer. If paper is to be used as a upport for the photoconductive layer, pretreatment of he paper against penetration of the coating solution in dvisable. The transparent support can produce a ransparent electrophotographic plate, foil or film. fter an electrostatic charge has been applied, i.e. after e layer has been charged positively or negatively by eans of a corona discharge, the layer becomes light ensitive.

The reproduction of images by the electrophotoraphic method is carried out as follows: when the hotoconductive layer has been charged by means of a orona discharge apparatus, the support with the sensized layer is exposed to light under a master and is then usted over in a per se known manner with a resin owder colored with carbon black. The image that now ecomes visible can easily be wiped off. It can also be xed by heating at about 120°C. From positive masters, ositive images characterized by good contrast the roducted.

This invention is still further illustrated with refernce to the following illustrative examples.

EXAMPLE 1

1 Gram of polyacenaphthylene and 0.6 gram of, as a lasticiser, chlorinated diphenyl (commercially availble as "Kanechlor"), are dissolved in 8 milliliters of hlorobenzene. To the solution are added 0.5 milliliters f dichloroethane containing 0.006 gram of a sensitizer orresponding to compound number listed in Table 1. he solution is applied to an aluminum plate by means f whirler coating and is dried to form a layer of 7$\mu$ in hickness. After said aluminum plate provided with the ayer is charged negatively by means of corona dischrge with a charging device maintained at approxiately 6000 volts in the dark, it is placed under a posiive master and is exposed to a 100W tungsten lamp at n illumination of 50 luxes, and the said plate is powered over with a developer in a per se known manner. This developer consists of toner and carrier. The toner consists of low melting point polystyrene, colophony and carbon black. The toner is mixed with a carrier substance such that the toner becomes triboelectrically charged with a charge opposite to that produced on the plate. A positive image is produced and is fixed by slight heating. In Table 2, there are shown the optimum amounts of exposure in lux-second units.

Table 2

| Compound Number | Optimum Exposure (lux.sec) |
|---|---|
| none | 200000 |
| 5 | 320 |
| 7 | 300 |
| 9 | 75 |
| 15 | 180 |
| 16 | 110 |
| 18 | 65 |
| 33 | 135 |
| 35 | 480 |
| 41 | 105 |
| 42 | 320 |
| 51 | 380 |
| 52 | 140 |
| 53 | 290 |
| 54 | 140 |
| 58 | 130 |
| 60 | 175 |
| 65 | 140 |
| 71 | 180 |
| 92 | 70 |
| 97 | 150 |
| 103 | 100 |
| 105 | 120 |
| 109 | 130 |
| 110 | 180 |
| 111 | 70 |
| 112 | 170 |
| 113 | 120 |
| 116 | 115 |

EXAMPLE 2

1 Gram of poly-N-vinylcarbazole, chlorinated diphenyl (commercially available as "Kanechlor") and 0.006 gram of a sensitizer, coresponding to compound number listed in Table 1, in 10 milliliters of dichloroethane to a solution. The solution is applied to an aluminum plate by means of blade coating and is dried to form a layer of 10$\mu$ in thickness. An electrophotographic image in the same way as that described in Example 1. In Table 3, there are shown the optimum amounts of exposure in lux-second units to produced exactly the original images.

Table 3

| Compound Number | Optimum Exposure (lux.sec) |
|---|---|
| none | 20000 |
| 1 | 50 |
| 2 | 220 |
| 3 | 60 |
| 4 | 70 |
| 5 | 22 |
| 6 | 44 |
| 7 | 26 |
| 8 | 62 |
| 9 | 44 |
| 10 | 48 |
| 11 | 160 |
| 12 | 220 |
| 13 | 90 |
| 14 | 75 |
| 15 | 28 |
| 16 | 36 |
| 17 | 115 |
| 18 | 22 |
| 23 | 180 |
| 26 | 110 |
| 27 | 44 |
| 28 | 36 |
| 29 | 40 |
| 30 | 60 |
| 32 | 120 |
| 33 | 36 |
| 34 | 50 |

Table 3-continued

| Compound Number | Optimum Exposure (lux.sec) |
|---|---|
| 35 | 30 |
| 36 | 46 |
| 37 | 90 |
| 41 | 52 |
| 42 | 44 |
| 43 | 48 |
| 45 | 75 |
| 47 | 58 |
| 48 | 34 |
| 49 | 35 |
| 50 | 70 |
| 51 | 30 |
| 53 | 26 |
| 54 | 28 |
| 56 | 28 |
| 57 | 20 |
| 58 | 24 |
| 59 | 36 |
| 60 | 44 |
| 61 | 44 |
| 62 | 100 |
| 64 | 54 |
| 65 | 44 |
| 66 | 22 |
| 67 | 74 |
| 70 | 56 |
| 71 | 20 |
| 72 | 22 |
| 76 | 60 |
| 78 | 38 |
| 80 | 46 |
| 82 | 50 |
| 83 | 24 |
| 84 | 19 |
| 85 | 17 |
| 86 | 54 |
| 87 | 42 |
| 88 | 25 |
| 89 | 28 |
| 90 | 30 |
| 91 | 140 |
| 92 | 18 |
| 93 | 20 |
| 34 | 23 |
| 95 | 40 |
| 96 | 66 |
| 29 | 24 |
| 98 | 230 |
| 99 | 460 |
| 100 | 50 |
| 101 | 36 |
| 102 | 115 |
| 103 | 36 |
| 104 | 68 |
| 105 | 19 |
| 106 | 120 |
| 107 | 58 |
| 108 | 76 |
| 109 | 46 |
| 110 | 36 |
| 111 | 20 |
| 112 | 42 |
| 113 | 48 |
| 114 | 54 |
| 115 | 54 |
| 116 | 52 |
| 117 | 64 |
| 118 | 50 |
| 119 | 135 |
| 120 | 90 |
| 121 | 30 |
| 122 | 28 |

It is clear from Table 3 that the novel sensitizers improve the photoconductivity of poly-N-vinylcarbazole.

EXAMPLE 3

1 Gram of brominated poly-N-vinylcarbazole (monobromo-substituted product), 0.5 gram of polycarbonate resin (commercially available as "Panlite-C"), 0.3 gram of chlorinated diphenyl (commercially available as "Kanechlor") and 0.002 gram of sensitizer listed in Table 1 are dissolved in a mixed-solvent of 8 milliliters of chlorobenzene and 2 milliliters of dichloroethane. This solution is applied to an aluminum plate by means of a blade coating and dried to form a layer of 14$\mu$ in thickness. On this support, electrophotographic images are produced in the same way as that described in Example 1. Table 4 shows the optimum amounts of exposure in lux-second units to reproduce exactly the original images.

Table 4

| Compound Number | Optimum Exposure (lux.sec) |
|---|---|
| none | 80000 |
| 1 | 75 |
| 2 | 280 |
| 3 | 67 |
| 4 | 44 |
| 5 | 20 |
| 6 | 26 |
| 7 | 18 |
| 8 | 30 |
| 9 | 22 |
| 10 | 40 |
| 11 | 120 |
| 12 | 400 |
| 13 | 110 |
| 14 | 75 |
| 15 | 25 |
| 16 | 28 |
| 17 | 135 |
| 18 | 23 |
| 19 | 410 |
| 20 | 340 |
| 21 | 180 |
| 22 | 40 |
| 23 | 130 |
| 24 | 60 |
| 25 | 300 |
| 26 | 100 |
| 27 | 52 |
| 28 | 52 |
| 29 | 48 |
| 30 | 110 |
| 31 | 320 |
| 32 | 270 |
| 33 | 27 |
| 34 | 30 |
| 35 | 26 |
| 37 | 52 |
| 38 | 440 |
| 39 | 110 |
| 40 | 125 |
| 41 | 22 |
| 42 | 28 |
| 43 | 32 |
| 44 | 75 |
| 45 | 105 |
| 46 | 170 |
| 47 | 42 |
| 48 | 32 |
| 49 | 35 |
| 50 | 50 |
| 51 | 48 |
| 52 | 20 |
| 53 | 19 |
| 54 | 42 |
| 55 | 230 |
| 56 | 26 |
| 57 | 22 |
| 58 | 24 |
| 59 | 23 |
| 60 | 26 |
| 61 | 36 |
| 62 | 130 |
| 63 | 190 |
| 64 | 44 |
| 65 | 26 |
| 66 | 20 |
| 67 | 46 |
| 68 | 75 |
| 69 | 115 |
| 70 | 42 |
| 71 | 18 |
| 72 | 20 |
| 73 | 48 |
| 74 | 110 |
| 75 | 115 |
| 76 | 70 |
| 77 | 44 |
| 78 | 35 |
| 79 | 75 |
| 80 | 50 |
| 81 | 145 |
| 82 | 35 |
| 83 | 20 |
| 84 | 19 |
| 85 | 17 |
| 86 | 34 |
| 87 | 34 |

Table 4-continued

| Compound Number | Optimum Exposure (lux.sec) |
|---|---|
| 88 | 20 |
| 89 | 20 |
| 90 | 25 |
| 91 | 100 |
| 92 | 15 |
| 93 | 17 |
| 94 | 16 |
| 95 | 40 |
| 96 | 52 |
| 97 | 26 |
| 98 | 180 |
| 99 | 140 |
| 100 | 46 |
| 101 | 36 |
| 102 | 58 |
| 103 | 20 |
| 104 | 34 |
| 105 | 21 |
| 106 | 80 |
| 107 | 44 |
| 108 | 40 |
| 109 | 23 |
| 110 | 26 |
| 111 | 17 |
| 112 | 26 |
| 113 | 28 |
| 114 | 40 |
| 115 | 44 |
| 116 | 28 |
| 117 | 44 |
| 118 | 36 |
| 119 | 105 |
| 120 | 52 |
| 121 | 26 |
| 122 | 21 |
| 123 | 15 |
| 124 | 25 |
| 125 | 17 |
| 126 | 14 |
| 127 | 11 |
| 128 | 13 |

It is clear from Table 4 and FIGS. 1 to 9 that the ovel sensitizers improve the photoconductivity and ıe spectrum characteristics of brominated poly-N-inylcarbazole.

The invention has been described in detail with parcular reference to preferred embodiments thereof, ut it will be understood that variations and modificaons can be effected within the spirit and scope of the ıvention as described hereinabove and as defined in ıe appended claims.

What we claim is:

1. An electrophotographic material comprising a ɔnductive support layer and photoconductive insulatıg layer, the latter comprising a combination of a hotoconductive polymeric compound and a sensitizıg amount of a sensitizer having the following formula:

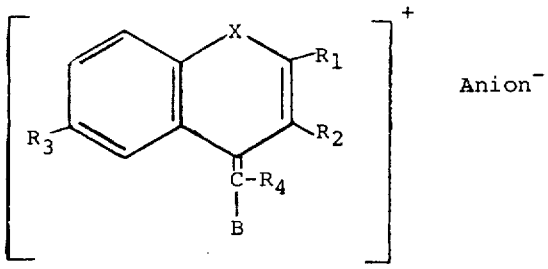

herein

B represents a radical selected from the group consting of

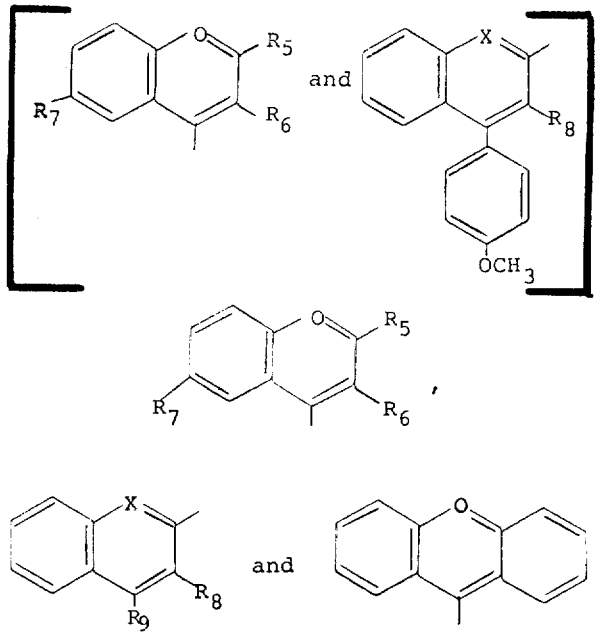

$R_1$ is hydrogen, phenyl or an ethenyl radical selected from the group consisting of styryl, p-methoxystyryl, 3,4-dimethoxy-styryl, α-phenylstyryl, α-phenyl-p-methoxystyryl, β-furyl(α')ethenyl and α-phenyl-β-furyl(α') ethenyl;

$R_2$ is hydrogen or phenyl;

$R_3$ is hydrogen, methyl or phenyl;

$R_4$ is hydrogen or phenyl;

$R_5$ is hydrogen, phenyl or an ethenyl radical selected from the group consisting of styryl, p-methoxystyryl, 3,4-dimethoxy-styryl, α-phenyl-p-methoxystyryl, β-furyl(α')ethenyl and α-phenyl-β-furyl(α')ethenyl;

$R_6$ is hydrogen or phenyl;

$R_7$ is hydrogen or phenyl;

*$R_8$ is hydrogen or phenyl;*

*$R_9$ is hydrogen or p-methoxyphenyl;* the anion is an anionic function selected from the group consisting of perchlorate, fluoroborate, chloroferrate, chlorozincate and nitrate; and X is oxygen or a sulfur atom;

said photoconductive polymeric compound comprising at least one compound selected from the group consisting of poly-N-vinylcarbazole, brominated poly-N-vinylcarbazole and polyacenaphthylene.

2. An electrophotographic material according to claim 1, wherein said sensitizer comprises at least one compound selected from the group consisting of 2-(α-phenyl-p-methoxystyryl)-4-[(2'-phenyl-4'-benzopyranylidene)methyl]benzopyrylium perchlorate, 2-p-methoxystyryl-4-[(2'-3'',4''-dimethoxystyryl-3'-phenyl-6'-methyl-4'-benzopyranylidene)methyl]benzopyrylium perchlorate, 2-[(2'-phenyl-4'-benzopyranylidene) methyl]-3-phenyl benzopyrylium fluoroborate, 2-[(2'-phenyl-4'-benzopyranylidene)methyl]-4-p-methoxyphenyl benzothiopyrylium perchlorate, and 2-[(2'-phenyl-4'-benzothiopyryanylidene)-methyl]-4-p-methoxyphenyl benzothiopyrylium perchlorate.

3. An electrophotographic material according to claim 1, wherein said combination comprises 100 weight parts of photoconductive polymeric compound and 0.01 to 3.0 weight parts of sensitizer.

* * * * *